United States Patent
Takemoto et al.

(10) Patent No.: US 9,638,955 B2
(45) Date of Patent: May 2, 2017

(54) LIQUID CRYSTAL DISPLAY DEVICE AND POLARIZING PLATE WITH A CONDENSING ELEMENT

(75) Inventors: Hiroyuki Takemoto, Ibaraki (JP); Minoru Miyatake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 537 days.

(21) Appl. No.: 12/754,123

(22) Filed: Apr. 5, 2010

(65) Prior Publication Data

US 2010/0253887 A1   Oct. 7, 2010

(30) Foreign Application Priority Data

Apr. 6, 2009  (JP) .................................. 2009-091905

(51) Int. Cl.
*G02F 1/1335* (2006.01)
*F21V 8/00* (2006.01)

(52) U.S. Cl.
CPC ..... *G02F 1/133606* (2013.01); *G02B 6/0056* (2013.01); *G02F 1/133615* (2013.01); *G02F 2001/133607* (2013.01)

(58) Field of Classification Search
None
See application file for complete search history.

(56) References Cited

U.S. PATENT DOCUMENTS 4,171,874 A * 10/1979 Bigelow ........... G02F 1/133605
                                                    349/102
4,704,004 A * 11/1987 Nosker ................... F21V 13/04
                                                    349/112

(Continued)

FOREIGN PATENT DOCUMENTS

JP    11-295714 A    10/1999
JP    11-326887 A    11/1999

(Continued)

OTHER PUBLICATIONS

Japanese Office Action dated Jun. 5, 2013, issued in corresponding Japanese Patent Application No. 2010-084834, w/ English translation.

*Primary Examiner* — Uyen Chau N Le
*Assistant Examiner* — Chris Chu
(74) *Attorney, Agent, or Firm* — Westerman, Hattori, Daniels & Adrian, LLP

(57) ABSTRACT

A liquid crystal display device according to the present invention includes a rear light source device, a rear polarizing plate, a liquid crystal cell including liquid crystal molecules that are substantially perpendicularly aligned during black display, and a front polarizing plate, which are provided in the stated order, wherein: an absorption axis of a polarizer of the rear polarizing plate is perpendicular to an absorption axis of a polarizer of the front polarizing plate; and condensed light in which a half-value angle in a direction perpendicular to the absorption axis of the polarizer of the rear polarizing plate is smaller than a half-value angle in a direction parallel to the absorption axis of the polarizer of the rear polarizing plate enters the rear polarizing plate. According to the present invention, a liquid crystal display device having an excellent front contrast ratio, and a polarizing plate with a condensing element for realizing the liquid crystal display device having the excellent front contrast ratio may be provided.

6 Claims, 10 Drawing Sheets

(56) References Cited

U.S. PATENT DOCUMENTS

| | | | |
|---|---|---|---|
| 5,046,827 A * | 9/1991 | Frost | G02B 5/1842 349/109 |
| 6,888,593 B1 * | 5/2005 | Nakamura et al. | 349/96 |
| 7,006,173 B1 | 2/2006 | Hiyama et al. | |
| 7,133,091 B2 | 11/2006 | Ohsumi | |
| 7,245,336 B2 | 7/2007 | Hiyama et al. | |
| 7,712,908 B2 | 5/2010 | Hoshi et al. | |
| 7,918,571 B2 | 4/2011 | Hoshi et al. | |
| 8,035,775 B2 | 10/2011 | Sakai | |
| 8,174,640 B2 | 5/2012 | Hoshi | |
| 8,334,950 B2 | 12/2012 | Hoshi et al. | |
| 2003/0156233 A1 | 8/2003 | Ohsumi | |
| 2005/0219449 A1 * | 10/2005 | Tanaka | 349/119 |
| 2005/0225706 A1 * | 10/2005 | Miyachi et al. | 349/117 |
| 2006/0125978 A1 | 6/2006 | Hiyama et al. | |
| 2008/0191997 A1 | 8/2008 | Min et al. | |
| 2008/0247192 A1 | 10/2008 | Hoshi et al. | |
| 2009/0040427 A1 | 2/2009 | Hoshi | |
| 2009/0059120 A1 | 3/2009 | Hoshi et al. | |
| 2009/0195728 A1 | 8/2009 | Obata et al. | |
| 2010/0165660 A1 * | 7/2010 | Weber et al. | 362/609 |
| 2010/0171906 A1 | 7/2010 | Sakai | |
| 2010/0188608 A1 | 7/2010 | Hoshi et al. | |
| 2010/0238686 A1 * | 9/2010 | Weber et al. | 362/609 |

FOREIGN PATENT DOCUMENTS

| | | |
|---|---|---|
| JP | 2000-122046 A | 4/2000 |
| JP | 2002-023170 A | 1/2002 |
| JP | 2007-286573 A | 11/2007 |
| JP | 2008-197652 A | 8/2008 |
| JP | 2008-216315 A | 9/2008 |
| JP | 2008-262133 A | 10/2008 |
| JP | 2008-262165 A | 10/2008 |
| JP | 2009-43460 A | 2/2009 |
| JP | 2009-59498 A | 3/2009 |
| JP | 2010-67441 A | 3/2010 |
| WO | 20081029555 A1 | 3/2008 |

* cited by examiner

LIQUID CRYSTAL DISPLAY DEVICE AND POLARIZING PLATE WITH A CONDENSING ELEMENT

BACKGROUND OF THE INVENTION

1. Field of the Invention

The present invention relates to a liquid crystal display device and a polarizing plate with a condensing element. More particularly, the present invention relates to a liquid crystal display device having an excellent front contrast ratio, and a polarizing plate with a condensing element for realizing the liquid crystal display device having the excellent front contrast ratio.

2. Description of the Related Art

Up to now, in order to increase a front contrast ratio of a liquid crystal display device, methods for minimizing depolarization scattering in a liquid crystal cell by means of an improvement of pigment dispersibility of a color filter, optimization of a liquid crystal material and a spacer material, and optimization of TFT wiring positions and MVA alignment protrusions have been employed (for example, Japanese Patent Application Laid-open No. 2008-216315 and Japanese Patent Application Laid-open No. 2002-23170). For other members than the liquid crystal cell, reduction in scattering of anti-glare treatment has been studied. As for a backlight, a technology for improving condensing characteristics to increase the front contrast ratio is used (for example, Japanese Patent Application Laid-open No. 2008-197652). However, even with those technologies, a liquid crystal display device having a sufficiently high front contrast ratio has not been obtained.

SUMMARY OF THE INVENTION

The present invention has been made to solve the conventional problem described above. An object of the present invention is to provide a liquid crystal display device having an excellent front contrast ratio, and a polarizing plate with a condensing element for realizing the liquid crystal display device having the excellent front contrast ratio.

A liquid crystal display device according to the present invention includes a rear light source device, a rear polarizing plate, a liquid crystal cell including liquid crystal molecules that are substantially perpendicularly aligned during black display, and a front polarizing plate, which are provided in the stated order, wherein: an absorption axis of a polarizer of the rear polarizing plate is perpendicular to an absorption axis of a polarizer of the front polarizing plate; and condensed light in which a half-value angle in a direction perpendicular to the absorption axis of the polarizer of the rear polarizing plate is smaller than a half-value angle in a direction parallel to the absorption axis of the polarizer of the rear polarizing plate enters the rear polarizing plate.

In a preferred embodiment, the half-value angle of the condensed light in the direction perpendicular to the absorption axis of the polarizer of the rear polarizing plate is smaller than half-value angles in other directions.

In a preferred embodiment, the rear light source device emits the condensed light.

In a preferred embodiment, the liquid crystal display device further includes a condensing element provided between the rear light source device and the rear polarizing plate, wherein the condensing element collimates light emitted from the rear light source device in a predetermined direction to convert the light into the condensed light.

In a preferred embodiment, a liquid crystal display device further includes a light diffusion element provided on an opposite side to the liquid crystal cell of the front polarizing plate, wherein the light diffusion element diffuses light exited from the front polarizing plate in at least the direction perpendicular to the absorption axis of the rear polarizing plate.

According to another aspect of the present invention, a polarizing plate with a condensing element is provided. The polarizing plate with a condensing element includes a condensing element for converting incident light into condensed light, and a polarizing plate, wherein a half-value angle of the condensed light in a direction perpendicular to an absorption axis of a polarizer of the polarizing plate is smaller than a half-value angle in a direction parallel to an absorption axis of a polarizer of the polarizing plate.

According to the present invention, the condensed light in which the half-value angle in the direction perpendicular to the absorption axis of the polarizer of the rear polarizing plate is smaller than the half-value angle in the direction parallel to the absorption axis of the polarizer of the rear polarizing plate passes through the rear polarizing plate, and then enters the liquid crystal cell including the liquid crystal molecules that are substantially vertically aligned during black display. Therefore, a liquid crystal display device may be provided, in which depolarization scattering in the liquid crystal cell is suppressed and an brightness in a front direction during black display is low, that is, a front contrast ratio is high.

DESCRIPTION OF THE PREFERRED EMBODIMENTS

A. Liquid Crystal Display Device

A-1. Entire Structure

Figure 1A:
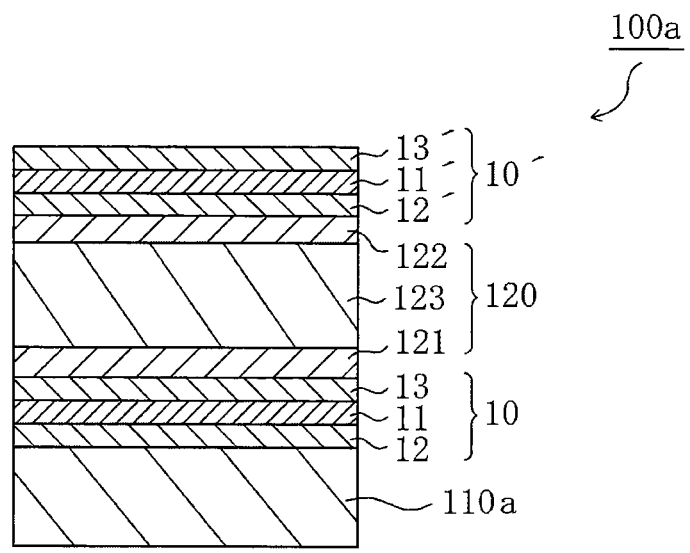
FIG. 1A is a schematic cross sectional view illustrating a liquid crystal display device according to a preferred embodiment of the present invention.

FIG. 1A is a schematic cross sectional view illustrating a liquid crystal display device according to a preferred embodiment of the present invention. A liquid crystal display device 100a includes a rear light source device 110a, a rear polarizing plate 10, a liquid crystal cell 120, and a front polarizing plate 10', which are provided in the stated order. The rear polarizing plate 10 includes a polarizer 11. The front polarizing plate 10' includes a polarizer 11'. In the illustrated example, the rear polarizing plate 10 includes protective layers 12 and 13 provided on both sides of the polarizer 11, and the front polarizing plate 10' includes protective layers 12' and 13' provided on both sides of the polarizer 11'. An absorption axis of the polarizer 11 of the rear polarizing plate 10 is perpendicular to an absorption axis of the polarizer 11' of the front polarizing plate 10'. The liquid crystal cell 120 includes a pair of substrates (typically, glass substrates) 121 and 122 and a liquid crystal layer 123 which is interposed between the substrates 121 and 122 and contains liquid crystal serving as a display medium. The liquid crystal layer 123 includes liquid crystal molecules (not shown) that are substantially vertically aligned during black display. Any suitable retardation layer (not shown) may be provided between the rear polarizing plate 10 and the liquid crystal cell 120 and/or between the liquid crystal cell 120 and the front polarizing plate 10', depending on purpose. At least one of the protective layers 12, 13, 12', and 13' may be omitted depending on purpose, polarizing plate structure, and liquid crystal display device structure.

Figure 1B:
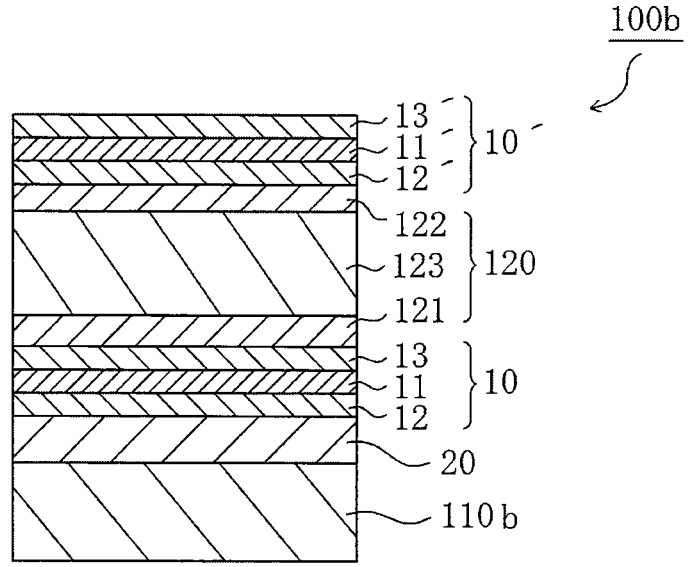
FIG. 1B is a schematic cross sectional view illustrating a liquid crystal display device according to another preferred embodiment of the present invention.

FIG. 1B is a schematic cross sectional view illustrating a liquid crystal display device according to another preferred embodiment of the present invention. A liquid crystal display device 100b further includes a condensing element 20 provided between a rear light source device 110b and the rear polarizing plate 10.

Figure 2:
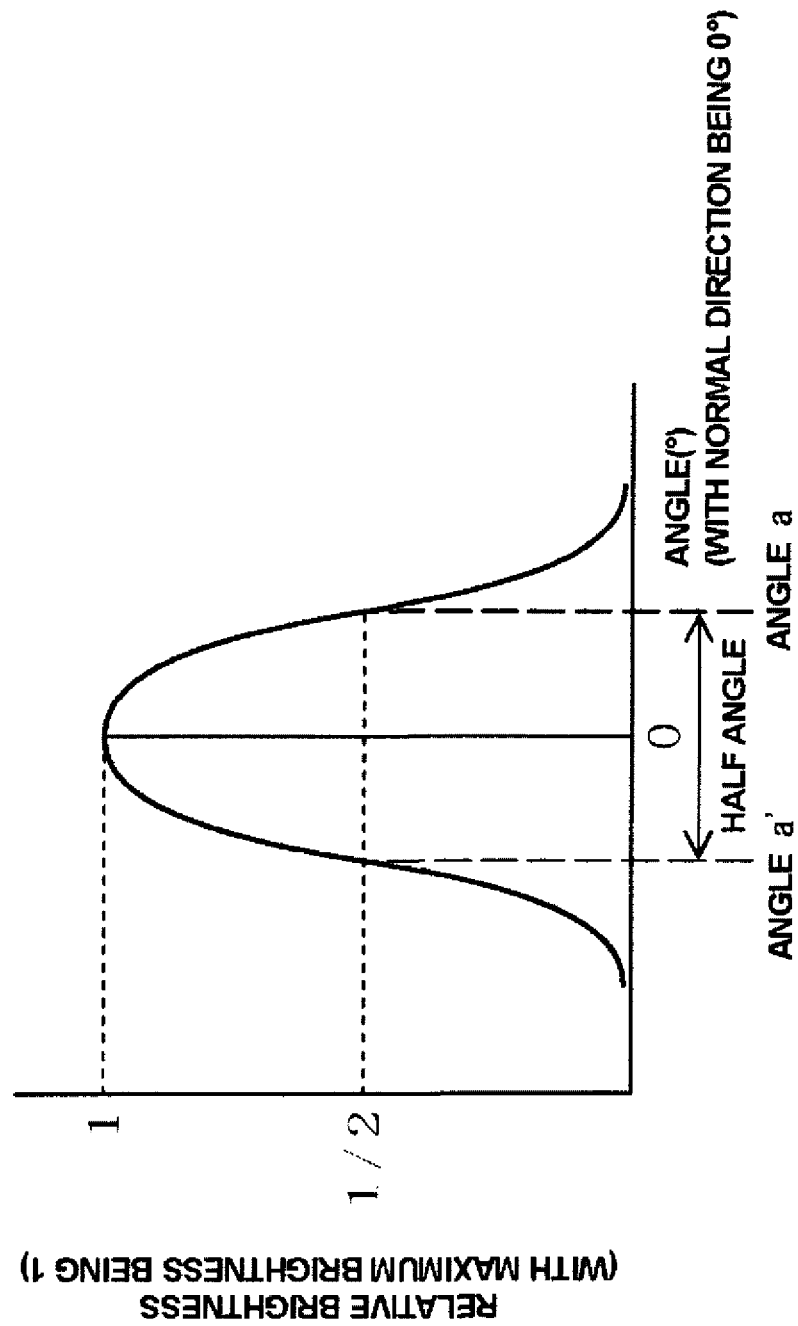
FIG. 2 is a schematic explanatory diagram illustrating a method of calculating a half-value angle.

In the liquid crystal display devices according to the present invention, condensed light enters the rear polarizing plate. A half-value angle of the condensed light in a direction perpendicular to the absorption axis of the polarizer of the rear polarizing plate is smaller than a half-value angle in a direction parallel to the absorption axis of the polarizer of the rear polarizing plate. The half-value angle of the condensed light in the direction perpendicular to the absorption axis of the polarizer of the rear polarizing plate is more preferably smaller than half-value angles in other directions. The condensed light is exited from the rear light source device or the condensing element. The light exited from the rear light source device or the condensing element may be condensed or not condensed in the direction parallel to the absorption axis of the polarizer of the rear polarizing plate. In this specification, a "half-value angle" is defined as follows: brightness at varying exit angles is measured in a predetermined direction within an exit surface. As illustrated in FIG. 2, exit angles when an brightness becomes ½ of a maximum brightness (typically, brightness at exit angle of 0°) are measured on both sides of a diffusion profile. An angle obtained by adding the angles measured on both sides ("(angle a)+(angle a')" in FIG. 2) is the half-value angle.

Figure 3A:
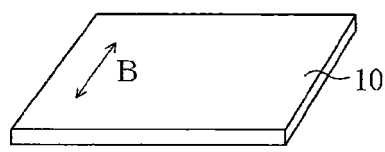
FIG. 3A is a schematic explanatory exploded perspective view illustrating a state in which collimated light enters a rear polarizing plate.

FIG. 3A is a schematic explanatory exploded perspective view illustrating a state in which condensed light enters the rear polarizing plate 10 in a case where the condensed light is emitted from the rear light source device 110a in the liquid crystal display device according to the present invention. For ease of understanding, members except the rear light source device 110a and the rear polarizing plate 10 are omitted from FIG. 3A. As illustrated in FIG. 3A, the rear light source device 110a emits condensed light 111 which is condensed to an in-plane region of a virtual plane 112. Only light in the in-plane region of the virtual plane 112 is illustrated in FIG. 3A. However, the condensed light actually exhibits, for example, a half-value angle described later. A half-value angle in a direction A perpendicular to a direction B of the absorption axis of the polarizer of the rear polarizing plate 10 is smaller than a half-value angle in the direction B. Hereinafter, in this specification, condensed light in which a half-value angle in a predetermined direction is smaller than half-value angles in other directions as described above are also referred to as "light collimated in a predetermined direction". That is, in FIG. 3A, the condensed light 111 is light collimated in the direction A. In this specification, the term "perpendicular" includes a case of "substantially perpendicular". The term "substantially perpendicular" includes a case of 90°±3.0°, preferably 90°±1.0°, and more preferably 90°±0.5°. The term "parallel" includes a case of "substantially parallel". The term "substantially parallel" includes a case of 0°±3.0°, preferably 0°±1.0°, and more preferably 0°±0.5°.

Figure 3B:
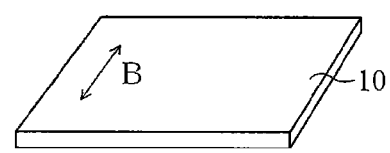
FIG. 3B is a schematic explanatory exploded perspective view illustrating a state in which collimated light enters the rear polarizing plate.
Figure 3B:
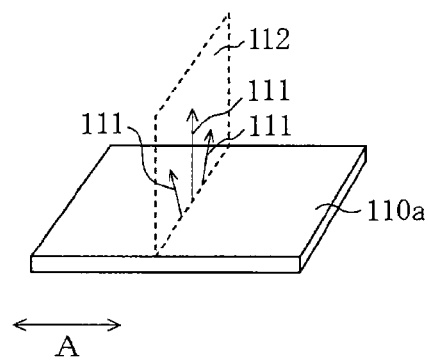
Figure 3B:
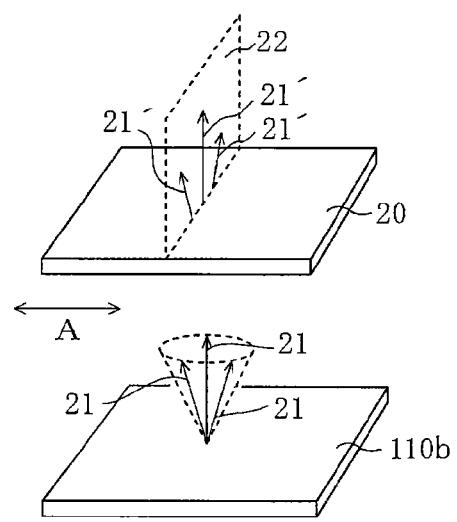

FIG. 3B is a schematic explanatory exploded perspective view illustrating a state in which condensed light enters the rear polarizing plate 10 in a case where the liquid crystal display device according to the present invention further includes the condensing element 20 and condensed light is exited from the condensing element 20, that is, light emitted from the rear light source device 110b is collimated by the condensing element 20 in a predetermined direction to be converted into condensed light. For ease of understanding, members except the rear light source device 110b, the condensing element 20, and the rear polarizing plate 10 are omitted from FIG. 3B. As illustrated in FIG. 3B, the rear light source device 110b emits exit light 21 in random directions. The exit light 21 passes through the condensing element 20 and is converted into condensed light 21' collimated in the direction A perpendicular to the direction B of the absorption axis of the polarizer of the rear polarizing plate 10. Only light in an in-plane region of a virtual plane 22 is illustrated in FIG. 3B. However, the condensed light actually exhibits, for example, a half-value angle described later. A half-value angle in the direction A perpendicular to the direction B of the absorption axis of the polarizer of the rear polarizing plate 10 is smaller than a half-value angle in the direction B.

A half-value angle Fw1 in a collimating direction (direction perpendicular to absorption axis of polarizer of rear polarizing plate) of light exited from the rear light source device or the condensing element which may exit the condensed light is preferably in a range of 5° to 60°, and more preferably in a range of 7° to 30°. When the half-value angle Fw1 is within such ranges, a liquid crystal display device in which depolarization scattering in the liquid crystal cell is small may be obtained.

When the half-value angle in the collimating direction (direction perpendicular to absorption axis of polarizer of rear polarizing plate) of light exited from the rear light source device or the condensing element which may exit the condensed light is denoted by Fw1 and a half-value angle in a direction perpendicular to the collimating direction (direction parallel to absorption axis of polarizer of rear polarizing plate) is denoted by Fw2, Fw2/Fw1 is preferably equal to or larger than 1.2, more preferably in a range of 1.2 to 10.0, and further more preferably in a range of 4.5 to 8.5. Therefore, when light is selectively collimated in the direction perpendicular to the absorption axis of the rear polarizer, a liquid crystal display device in which depolarization scattering in the liquid crystal cell is small may be obtained.

An average of the half-value angle Fw1 in the collimating direction of light exited from the rear light source device or the condensing element which may exit the condensed light and the half-value angle Fw2 in the direction perpendicular to the collimating direction ((Fw1+Fw2)/2) is preferably in a range of 20° to 120°, and more preferably in a range of 30° to 100°.

In the liquid crystal display device according to the present invention, the light collimated in the direction perpendicular to the absorption axis of the polarizer of the rear polarizing plate enters the rear polarizing plate. Linearly polarized light exited from the rear polarizing plate is collimated in a vibration direction thereof (direction A illustrated in FIGS. 3A and 3B). In such a liquid crystal display device, the linearly polarized light may enter the liquid crystal cell including liquid crystal molecules that are substantially vertically aligned during black display, in the vibration direction of the linearly polarized light at a small incident angle. As a result, depolarization scattering in the liquid crystal cell may be effectively suppressed, and hence a liquid crystal display device in which the brightness during black display is low and the front contrast ratio is high is obtained. The reason why such an effect is obtained is not clear, but it is presumed that the brightness during black display is effected by an angle between the vibration direction of the linearly polarized light entering the liquid crystal cell and an alignment direction of the liquid crystal molecules.

Figure 4A:
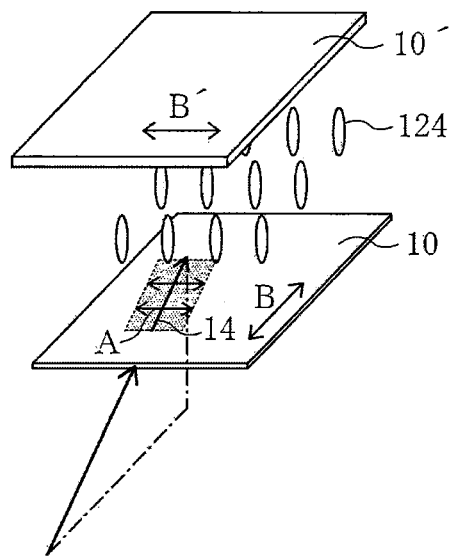
FIG. 4A is an explanatory view illustrating a relationship between a vibration direction of linearly polarized light entering a liquid crystal cell and an alignment direction of liquid crystal molecules of the liquid crystal cell.
Figure 4C:
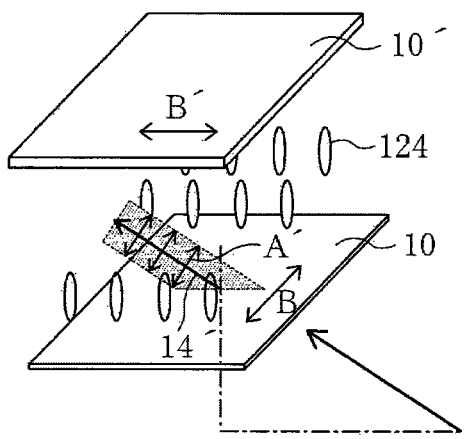
FIG. 4C is an explanatory view illustrating a relationship between the vibration direction of the linearly polarized light entering the liquid crystal cell and the alignment direction of the liquid crystal molecules of the liquid crystal cell, for comparison with FIG. 4A.
Figure 4B:
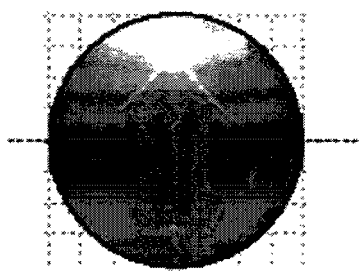
FIG. 4B illustrates a result obtained by measurement of depolarization scattering in a case of FIG. 4A.
Figure 4D:
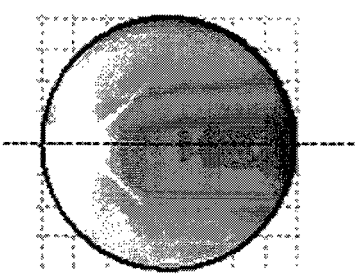
FIG. 4D illustrates a result obtained by measurement of depolarization scattering in a case of FIG. 4C.

The effect presumed as described above is more specifically described with reference to FIG. 4. FIG. 4A is an explanatory view illustrating a relationship between the vibration direction of the linearly polarized light entering the liquid crystal cell and the alignment direction of the liquid crystal molecules during black display, which corresponds to the preferred embodiment of the present invention. FIG. 4B illustrates a result obtained by measurement of depolarization scattering in a case of FIG. 4A. FIG. 4C is an explanatory view illustrating a relationship between the vibration direction of the linearly polarized light entering the liquid crystal cell and the alignment direction of the liquid crystal molecules during black display, for comparison with FIG. 4A. FIG. 4D illustrates a result obtained by measurement of depolarization scattering in a case of FIG. 4C. For ease of understanding, in FIGS. 4A and 4C, elements (substrate and liquid crystal layer) except liquid crystal molecules 124 are omitted from the liquid crystal cell, and the rear polarizing plate 10 (absorption axis B), the liquid crystal molecules 124, the front polarizing plate 10' (absorption axis B'), and linearly polarized light beams 14 and 14' (vibration directions A and A') are illustrated. In FIGS. 4A and 4C, the vibration directions A and A' of the linearly polarized light beams are in plane indicated by hatch marks.

In FIG. 4A, the linearly polarized light beam 14 generated through the rear polarizing plate 10 obliquely enters the liquid crystal cell at a predetermined angle in the direction parallel to the absorption axis B of the polarizer of the rear polarizing plate 10. The vibration direction A of the linearly polarized light beam 14 is perpendicular to the alignment direction of the liquid crystal molecules 124. In such a case, the linearly polarized light beam 14 recognizes only an ordinary refractive index of the liquid crystal molecules 124, and hence large depolarization scattering may not be caused by thermal fluctuations of the liquid crystal molecules 124. On the other hand, in FIG. 4C, the linearly polarized light beam 14' generated through the rear polarizing plate 10 obliquely enters the liquid crystal cell at a predetermined angle in the direction perpendicular to the absorption axis B of the polarizer of the rear polarizing plate 10. The vibration direction A' of the linearly polarized light beam 14' is not perpendicular to the alignment direction of the liquid crystal molecules 124. In such a case, the linearly polarized light beam 14' recognizes even an extraordinary refractive index of the liquid crystal molecules 124, and hence relatively large depolarization scattering may be caused by thermal fluctuations of the liquid crystal molecules 124. As a result, as illustrated in FIG. 4B, the amount of scattering of the polarized light during black display and a scattering brightness in a front direction in the case of FIG. 4A may be smaller than in the case of FIG. 4C (that is, than measurement result illustrated in FIG. 4D). The linearly polarized light beam 14 illustrated in FIG. 4A corresponds to "condensed light in which a half-value angle in the direction perpendicular to the absorption axis of the polarizer of the rear polarizing plate is smaller than a half-value angle in the direction parallel to the absorption axis of the polarizer of the rear polarizing plate (light collimated in direction perpendicular to absorption axis of polarizer of rear polarizing plate)" passing through the rear polarizing plate in the liquid crystal display device according to the present invention. That is, in the liquid crystal display device according to the present invention, the linearly polarized light collimated in the direction perpendicular to the absorption axis of the polarizer of the rear polarizing plate enters the liquid crystal cell in the vibration direction at a small incident angle, and the liquid crystal cell includes the liquid crystal molecules that are substantially vertically aligned during black display. Therefore, the scattering brightness during black display may be reduced (that is, light leakage during black display may be reduced), to thereby increase the front contrast ratio.

The liquid crystal display device according to the present invention may include a light diffusion element (not shown) provided on an opposite side (viewer side) of the front polarizing plate 10' with respect to the liquid crystal cell 120. When the light diffusion element is provided, a liquid crystal display device having an excellent front contrast ratio and a wide viewing angle may be obtained.

A-2. Rear Light Source Device

Any suitable light source device may be used as the rear light source device depending on usage (illumination type of liquid crystal display device, driving mode of liquid crystal cell, presence or absence of condensing element, or type of condensing element). The rear light source device may be of a direct-under type or a side-light type. Examples of the light source include a cold cathode fluorescent lamp and an LED.

In an embodiment, a light source device capable of emitting condensed light is used as the rear light source device. An example of the light source device includes a side-light type light source device with variable angle prisms.

Figure 5:
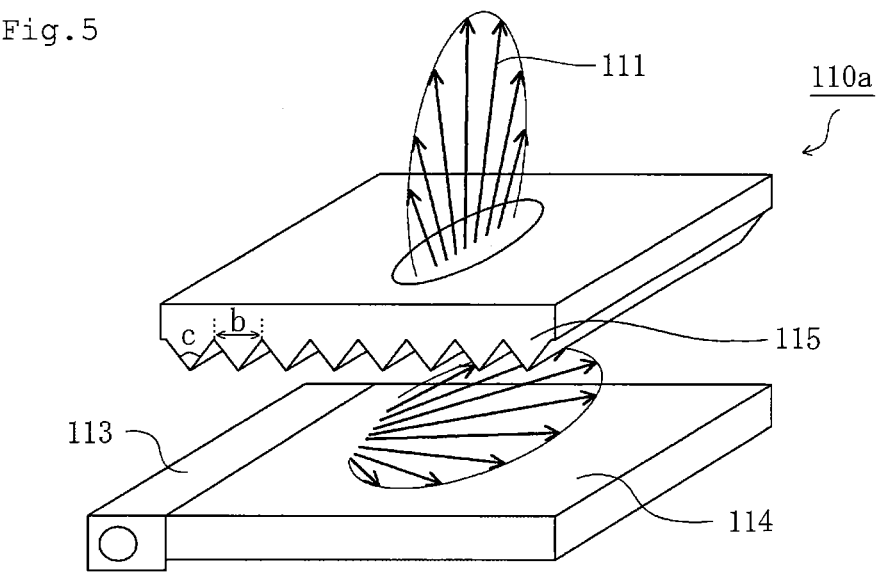
FIG. 5 is a schematic perspective view illustrating a side-light type light source device with variable angle prisms, which is used in the preferred embodiment of the present invention.

FIG. 5 is a schematic perspective view illustrating the side-light type light source device with variable angle prisms, which is used in the preferred embodiment of the present invention. A side-light type light source device 110a with variable angle prisms includes a light source 113, a light guide plate 114, and a plurality of columnar-shaped variable angle prisms 115. The columnar-shaped variable angle prisms 115 are preferably arranged in parallel so that a convex surface (vertex angle side) is an incident side. The columnar-shaped variable angle prisms 115 may convert a traveling direction of light exited from the light guide plate 114 into a vertical direction. A lens pitch b of the columnar-shaped variable angle prisms 115 is preferably in a range of 30 µm to 0.5 mm. A vertex angle c of the columnar-shaped variable angle prisms 115 is preferably in a range of 50° to 120°. The side-light type light source device 110a with variable angle prisms may include an anisotropic diffusion layer (not shown) located on a flat surface side of the columnar-shaped variable angle prisms 115, if necessary. The side-light type light source device 110a with variable angle prisms which has the structure as described above may emit light collimated in a direction perpendicular to a direction in which the columnar-shaped variable angle prisms 115 extend (right and left direction in FIG. 5).

A resin having a high visible transmittance and a high refractive index is suitably used as a material of the columnar-shaped variable angle prisms. Examples of the resin include an acrylic resin, a polyester resin, an epoxy resin, a polycarbonate resin, a vinyl chloride resin, and an active-energy-ray curable resin.

A thickness of the columnar-shaped variable angle prisms is preferably in a range of 20 µm to 250 µm, and more preferably in a range of 30 µm to 100 µm.

Examples of a method of producing the columnar-shaped variable angle prisms which may be used include forming methods such as extrusion molding and injection molding.

Any suitable diffusion layer may be used as the anisotropic diffusion layer. An example of the anisotropic diffusion layer includes an anisotropic diffusion sheet.

A-3. Condensing Element

The liquid crystal display device according to the present invention may include the condensing element provided between the rear light source device and the rear polarizing plate in a case where a light source for emitting light in random directions is used as the rear light source device. The condensing element has a function for collimating incident light in a predetermined direction to convert into condensed light. Therefore, when the condensing element is used, light emitted from the rear light source device in random directions may be collimated in the predetermined direction to enter the rear polarizing plate.

Any suitable condensing element capable of exiting light exhibiting the half-value angle may be used as the condensing element. Examples of the condensing element include (1) a condensing element having a planoconvex lens, (2) a condensing element having a louver layer, and (3) a condensing element having a Fresnel lens. A thickness of the condensing element may vary depending on a structure thereof. A typical thickness of the condensing element is preferably in a range of 20 µm to 250 µm, and more preferably in a range of 30 µm to 100 µm.

Figure 6A:
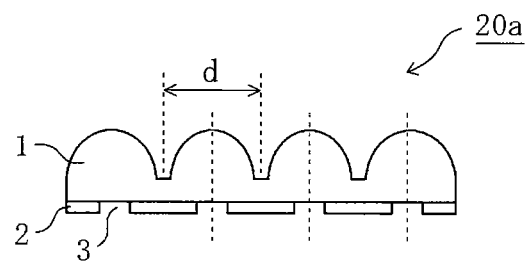
FIG. 6A is a schematic cross sectional view illustrating a condensing element having a lenticular lens, which is used in the preferred embodiment of the present invention.
Figure 6B:
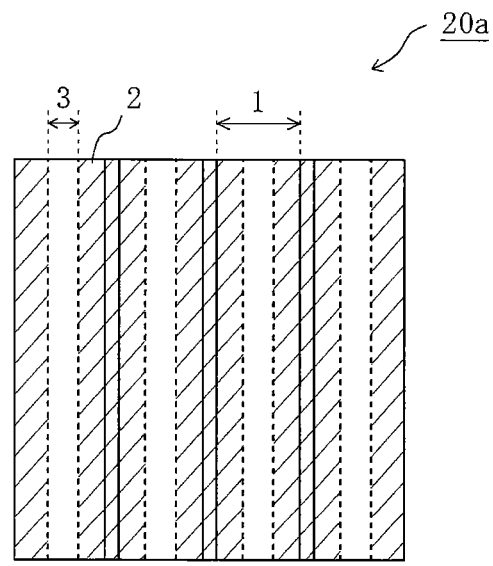
FIG. 6B is a schematic plan view illustrating the condensing element illustrated in FIG. 6A.

The planoconvex lens is typically a lenticular lens. Hereinafter, a case where the lenticular lens is used is specifically described for the sake of simplification. FIG. 6A is a schematic cross sectional view illustrating a condensing element having the lenticular lens, which is used in the preferred embodiment of the present invention. FIG. 6B is a schematic plan view illustrating the condensing element. A condensing element 20a includes a lenticular lens portion 1 and a light shielding layer 2. The condensing element 20a may exit collimated light when a convex surface of the lenticular lens portion 1 is set on an exit side.

As illustrated in FIGS. 6A and 6B, the lenticular lens portion 1 includes a plurality of half-cylindrical lenticular lenses arranged in parallel. A lens pitch d of the lenticular lenses is preferably equal to or smaller than 0.5 mm, and more preferably equal to or smaller than 0.2 mm. FIG. 6 illustrate the half-cylindrical lenticular lenses. However, as long as light exhibiting the half-value angle as described above may be exited, any suitable shape (for example, half-elliptic cylindrical shape) may be employed as the shape of the lenticular lenses.

The light shielding layer 2 is formed on a flat surface side of the lenticular lens portion 1. Opening portions 3 are provided in portions of the light shielding layer 2, which correspond to top parts of the ridge of the lenticular lens portion 1. When the light shielding layer 2 having the opening portions 3 is provided, light leakage in an oblique direction may be prevented, and hence a condensing element capable of exiting light having a small half-value angle may be obtained. The light shielding layer 2 may be light-absorptive or light-reflective. As illustrated in FIG. 6B, the opening portions 3 preferably have a band shape. When the opening portions have the band shape, a condensing element capable of selectively collimating light in a direction perpendicular to a direction in which the opening portions 3 extend (right and left direction in FIG. 6) may be obtained. An area ratio of the opening portions 3 to the flat surface of the lenticular lens portion 1 is preferably in a range of 5% to 50%, and more preferably in a range of 10% to 30%. When the area ratio of the opening portions is within the ranges and the opening portions 3 have the band shape, a condensing element exhibiting the half-value angle as described above may be obtained.

An example of a method of producing the condensing element described above includes a method of using a roll having grooves corresponding to a predetermined lens pattern to form the lens pattern in one surface of, a sheet material, a film material, or a plate material for the lenticular lens portion, and then forming an aluminum or silver pattern on the flat surface side of the lenticular lens portion by evaporation to form the light shielding layer having the opening portions.

A resin having a high visible transmittance and a high refractive index is suitably used as a material of the lenticular lens portion. Examples of the resin include an acrylic resin such as polymethylmethacrylate (PMMA), a polyester resin such as polyethylene terephthalate, an epoxy resin, a polycarbonate resin, and a vinyl chloride resin.

Any suitable pattern may be employed as the lens pattern of the roll described above as long as the condensing element exits light exhibiting the half-value angle. The lens pattern is typically a pattern corresponding to the lenticular lens portion described above.

Other than the lenticular lens, any suitable lens may be employed as the planoconvex lens as long as the lens exits light exhibiting the half-value angle as described above. An example of the planoconvex lens except the lenticular lens includes a cannonball type lens. When the cannonball type lens is employed, the condensing element includes: a cannonball type lens portion having a plurality of cannonball type lenses arranged in array; and an anisotropic diffusion sheet capable of diffusing incident light in one direction. An example of the anisotropic diffusion sheet includes a sheet in which fibers or ellipsoidal fine particles which are oriented in one direction are dispersed.

Figure 7:
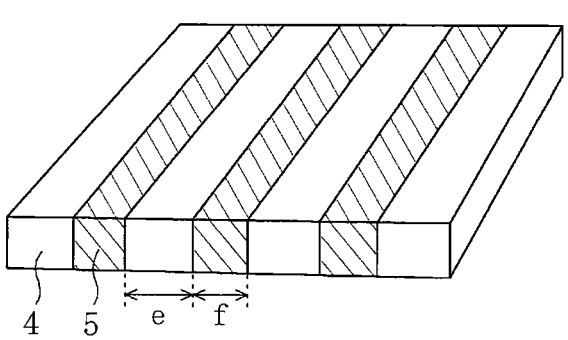
FIG. 7 is a schematic perspective view illustrating a condensing element having a louver layer, which is used in the preferred embodiment of the present invention.
Figure 7:
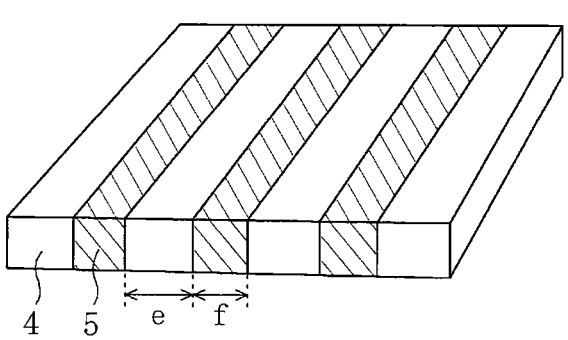

FIG. 7 is a schematic perspective view illustrating a condensing element having a louver layer, which is used in the preferred embodiment of the present invention. A condensing element 20b includes a louver layer in which transparent resin portions 4 and light absorption resin portions 5 are alternately formed into a stripe shape. A width e of the transparent resin portions 4 is preferably in a range of 50 μm to 500 μm, and more preferably in a range of 70 μm to 200 μm. A width f of the light absorption resin portions 5 is preferably in a range of 1 μm to 100 μm, and more preferably in a range of 3 μm to 50 μm. In the condensing element 20b including the louver layer, light with a large incident angle is absorbed by or reflected on the light absorption resin portions 5, and a traveling direction of light passing through the transparent resin portions 4 is controlled to be a predetermined exit angle to exit collimated light. Therefore, a direction of light collimated by the condensing element 20b including the louver layer is perpendicular to the stripe pattern illustrated in FIG. 7.

For example, a resin having a high visible transmittance is suitably used as a material of the transparent resin portions. Examples of the material include: a cellulose-based resin such as cellulose acetate butyrate or triacetyl cellulose; polyolefin such as polyethylene or polypropylene; a polyester resin such as polyethylene terephthalate; a silicone resin; polystyrene; polyurethane; polyvinyl chloride; an acrylic resin; and polycarbonate. An example of a material of the light absorption resin portions includes a material in which a light shielding material is contained in the material of the transparent resin portions. Examples of the light shielding material include a dark pigment such as carbon black, a dark dye, a metal, and a metal oxide.

An example of a method of producing the louver layer includes a method of alternately laminating the material of the transparent resin portions and the material of the light absorption resin portions and then slicing the resultant laminate along a direction perpendicular to a laminated surface (lamination direction) to have a desired thickness.

Figure 8:
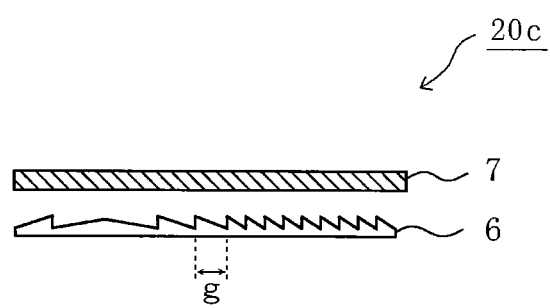
FIG. 8 is a schematic cross sectional view illustrating a condensing element having a Fresnel lens, which is used in the preferred embodiment of the present invention.

FIG. 8 is a schematic cross sectional view illustrating a condensing element having a Fresnel lens (linear Fresnel lens in illustrated example), which is used in the preferred embodiment of the present invention. A condensing element 20c includes a Fresnel lens 6 and, if necessary, a diffusion element 7.

A pattern of the Fresnel lens is preferred to be formed into a linear shape. When the pattern in the condensing element having the Fresnel lens is formed into the linear shape, light collimated in a direction perpendicular to the linear direction may be exited therefrom.

A lens pitch g of the Fresnel lens is preferably in a range of 0.02 mm to 0.5 mm, and more preferably in a range of 0.05 mm to 0.2 mm. The pitch of the Fresnel lens may be constant or not.

Any suitable diffusion element may be employed as the diffusion element described above. Examples of the diffusion element include a surface unevenness type diffusion film or internal diffusion film in which a binder including fine particles is applied onto a transparent substrate film, a phase separation extrusion sheet in which immiscible resins are mixed and subjected to extrusion molding, and an embossed sheet of which the surface is provided with an unevenness pattern by an embossing roll.

A-4. Polarizer

The rear polarizing plate is preferred to include the polarizer and the protective layers provided on both sides of the polarizer.

As the polarizer used in the present invention, any suitable polarizer may be employed depending on purpose. Examples of the polarizer include: a film prepared by adsorbing a dichromatic substance, for example, iodine or a dichromatic dye on a hydrophilic polymer film, for example, a polyvinyl alcohol-based film, a partially formalized polyvinyl alcohol-based film, or a partially saponified ethylene/vinyl acetate copolymer-based film, and subjecting the resultant to uniaxial stretching; and a polyene-based orientation film, for example, a dehydrated product of polyvinyl alcohol or a dehydrochlorinated product of polyvinyl chloride. Of the films, a polarizer prepared by adsorbing a dichromatic substance, for example, iodine on a polyvinyl alcohol-based film, and subjecting the resultant to uniaxial stretching is particularly preferred because of high polarized dichromaticity. A thickness of the polarizer is not particularly limited, and is generally approximately 1 μm to 80 μm.

The polarizer prepared by adsorbing iodine on a polyvinyl alcohol-based film, and subjecting the resultant to uniaxial stretching may be manufactured by, for example, immersing polyvinyl alcohol in an aqueous solution of iodine for coloring and subjecting the resultant to stretching to three to seven times the original length. If necessary, the aqueous solution may contain boric acid, zinc sulfate, or zinc chloride, or the polyvinyl alcohol may be immersed in an aqueous solution of, for example, potassium iodide. Further, if necessary, the polyvinyl alcohol-based film may be immersed and washed in water before coloring.

When the polyvinyl alcohol-based film is washed with water, contamination or antiblocking agent on a surface of the polyvinyl alcohol-based film may be removed. In addition to this, when the polyvinyl alcohol-based film is swelled, there is an effect of preventing nonuniformity, for example, uneven coloring. The stretching may be performed after coloring with iodine, performed during coloring, or followed by coloring with iodine. The stretching may be performed in an aqueous solution of boric acid or potassium iodide or in a water bath.

The protective layer is formed of any appropriate film which can be used as a protective layer for a polarizing plate. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof includes a thermosetting resin or a UV-curing resin such as a (meth) acrylic-based resin, an urethane-based resin, a (meth)acrylic urethane-based resin, an epoxy-based resin, or a silicone-based resin. Still another example thereof includes, for example, a glassy polymer such as a siloxane-based polymer. Further, a polymer film described in JP 2001-343529 A (WO 01/37007) may also be used. To be specific, the film can be formed of a resin composition containing a thermoplastic resin having a substituted or unsubstituted imide group on a side chain and a thermoplastic resin having a substituted or unsubstituted phenyl group and a nitrile group on a side chain. A specific example thereof includes a resin composition containing an alternate copolymer of isobutene and N-methylmaleimide and an acrylonitrile-styrene copolymer. The polymer film may be an extruded product of the resin composition, for example.

Preferably, the above protective film (inner protective film) exhibits optical isotropy. Specifically, the thickness direction retardation Rth (550) of the inner protective film is preferably −20 nm to +20 nm, more preferably −10 nm to +10 nm, much more preferably −6 nm to +6 nm, and particularly preferably −3 nm to +3 nm. The in-plane retardation Re(550) of the inner protective film is preferably 0 nm or more and 10 nm or less, more preferably 0 nm or more and 6 nm or less, and much more preferably 0 nm or more and 3 nm or less. The details of films forming such a protective film having optical isotropy are described in JP 2008-180961 A, which is incorporated herein by reference.

The same polarizing plate as the rear polarizing plate may be used as the front polarizing plate.

A-5. Liquid Crystal Cell

The liquid crystal cell includes the pair of substrates (typically, glass substrates) and the liquid crystal layer which is interposed between the substrates and contains the liquid crystal serving as the display medium. The liquid crystal layer includes liquid crystal molecules that are substantially vertically aligned during black display. When the liquid crystal layer includes liquid crystal molecules that are substantially vertically aligned during black display, a depolarization scattering suppression effect exhibited in a case where linearly polarized light collimated in the vibration direction enters the liquid crystal cell is remarkably obtained. Examples of a driving mode of the liquid crystal cell including the liquid crystal layer include a vertical alignment (VA) mode, a multi-domain vertical alignment (MVA) mode, a pattern VA (PVA) mode, a twisted nematic (TN) mode, an electrically controlled birefringence (ECB) mode, and an optically compensated bend (OCB) mode.

A-6. Light Diffusion Element

The liquid crystal display device according to the present invention may include the light diffusion element provided on an opposite side (viewer side) of the front polarizing plate with respect to the liquid crystal cell. When the light diffusion element is provided, a liquid crystal display device having an excellent front contrast ratio and a wide viewing angle may be obtained.

With respect to the light diffusion element, the light diffusion of the light diffusion element may be isotropic or anisotropic. The light diffusion element is preferred to be an anisotropic light diffusion element capable of selectively diffusing light in the direction perpendicular to the absorption axis of the polarizer of the rear polarizing plate. When the light diffusion element is used, a liquid crystal display device having an excellent front contrast ratio and a wide viewing angle may be obtained.

Figure 9:
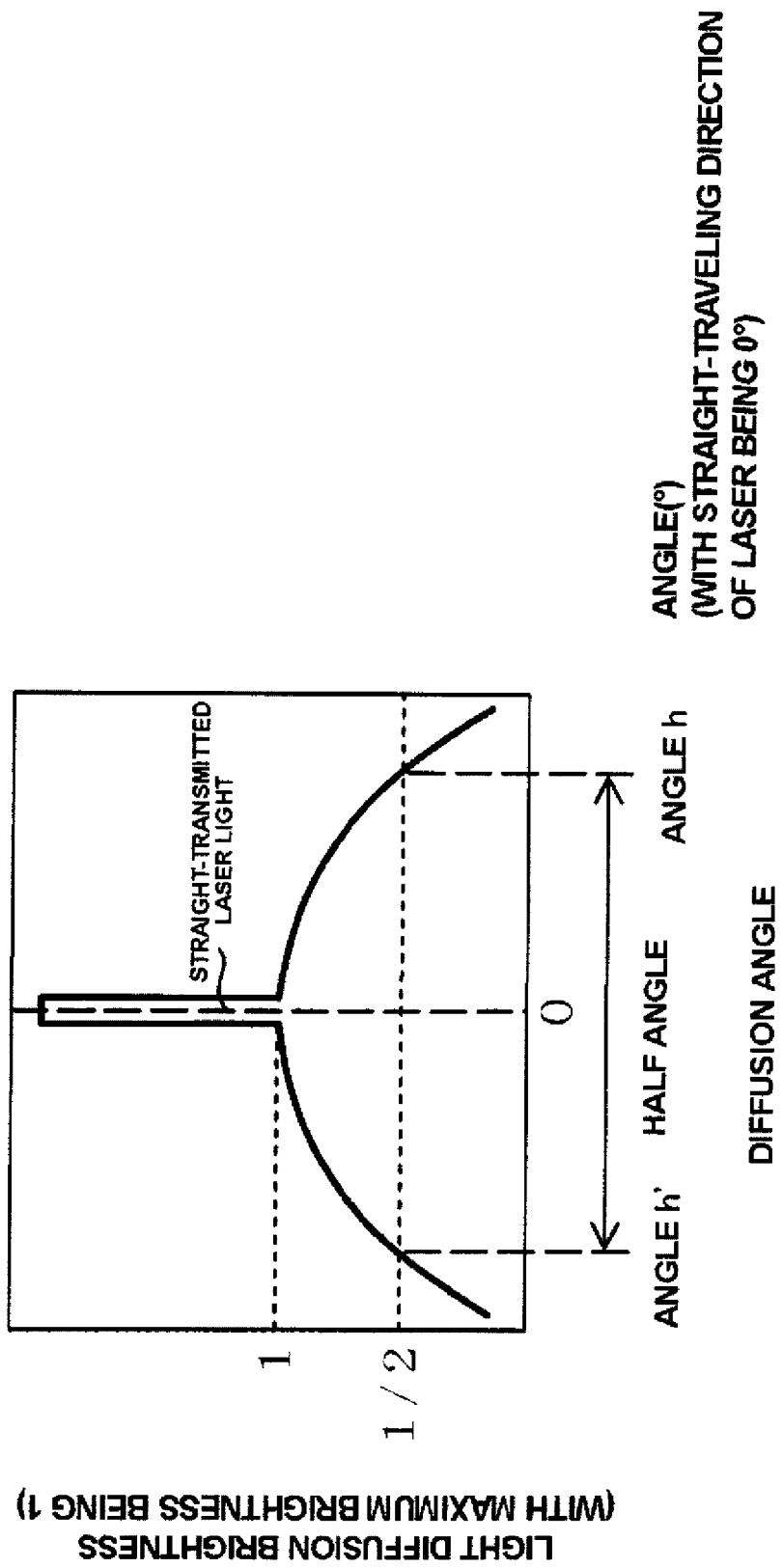
FIG. 9 is a schematic explanatory diagram illustrating a method of calculating a light diffusion half-value angle.

When the light diffusion of the light diffusion element is isotropic, a diffusion half-value angle of the light diffusion element is preferably in a range of 5° to 100° in any direction. The diffusion half-value angle may be selected depending on the usage of the liquid crystal display device. In the case of usage in which the need for brightness in an oblique direction is low, for example, in the case of usage of PDA, the diffusion half-value angle is preferably in a range of 5° to 50°. In the case of usage in which the same brightness in the oblique direction as in the front direction is required, for example, in the case of monitor usage, the diffusion half-value angle is preferably in a range of 30° to 70°. Note that the diffusion half-value angle is defined as follows: a laser light beam is emitted from the front of the light diffusion element. Diffusion brightness of the diffused light at varying diffusion angles is measured. As illustrated in FIG. 9, diffusion angles corresponding to a half of a maximum value of diffusion intensities of light beams other than a straight-transmitted laser light beam are measured on both sides of a diffusion profile. A value obtained by adding the angles measured on both sides ("(angle h)+(angle h')" in FIG. 9) is the light diffusion half-value angle.

When the light diffusion element selectively diffuses light in the direction perpendicular to the absorption axis of the polarizer of the rear polarizing plate, the diffusion half-value angle in the direction perpendicular to the absorption axis of the polarizer of the rear polarizing plate of the light diffusion element is preferably in a range of 5° to 60°. The diffusion half-value angle in the absorption axis direction of the polarizer of the rear polarizing plate of the light diffusion element is preferably in a range of 20° to 120°.

The light diffusion element may be obtained by any suitable method. The light diffusion element may be obtained by, for example, dispersing fine particles into a transparent resin binder.

The light diffusion element may be integrated with, if necessary, a protective film, a pressure-sensitive adhesive layer, an adhesive layer, and/or a surface treatment layer (for example, hard coat treatment layer or anti-reflection treatment layer).

The light diffusion element may be a marketed product. A specific example of the marketed product of the light diffusion element includes the product name "Holographic Diffusers LSD5PE5-10" produced by Physical Optics Corporation.

B. Polarizing Plate with a Condensing Element

Figure 10:
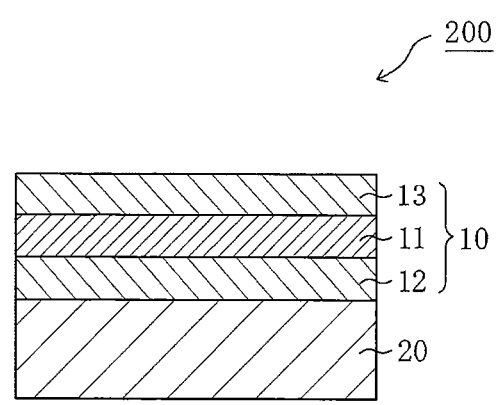
FIG. 10 is a schematic cross sectional view illustrating a polarizing plate with a condensing element according to the preferred embodiment of the present invention.

The polarizing plate with a condensing element according to the present invention includes the condensing element and the polarizing plate. FIG. 10 is a schematic cross sectional view illustrating the polarizing plate with a condensing element according to the preferred embodiment of the present invention. A polarizing plate with a condensing element 200 includes the polarizing plate 10 and the condensing element 20. The polarizing plate 10 includes the polarizer 11. In the illustrated example, the polarizing plate 10 includes the protective layers 12 and 13 provided on both sides of the polarizer 11. The polarizing plate with a condensing element 200 is typically provided between the rear light source device and the liquid crystal cell in the liquid crystal display device. In this case, the condensing element 20 is provided on the rear light source device side. The condensing element 20, the polarizer 11, and the protective layers 12 and 13 are bonded through any suitable adhesive layer or pressure-sensitive adhesive layer. At least one of the protective layers 12 and 13 may be omitted depending on purpose, polarizing plate structure, and liquid crystal display device structure.

The polarizing plate described in part A-4 may be used as the polarizing plate 10.

The condensing element 20 converts incident light into condensed light. The half-value angle of the condensed light in the direction perpendicular to the absorption axis of the polarizer 11 of the polarizing plate 10 is smaller than the half-value angle in the direction parallel to the absorption axis of the polarizer 11 of the polarizing plate 10. The half-value angle of the condensed light in the direction perpendicular to the absorption axis of the polarizer 11 of the polarizing plate 10 is more preferably smaller than half-value angles in other directions. The condensing element described in part A-3 may be used as the condensing element 20.

The polarizing plate with a condensing element according to the present invention may convert the incident light into the linearly polarized light collimated in the vibration direction and exit the converted light. Therefore, for example, when the polarizing plate with a condensing element to be used is provided between the rear light source device and the liquid crystal cell in the liquid crystal display device as described above, a liquid crystal display device having a high front contract ratio may be obtained.

A total thickness of the polarizing plate 10 and the condensing element 20 is preferably in a range of 20 μm to 300 μm, and more preferably in a range of 30 μm to 250 μm.

The liquid crystal display device of the present invention may be used for any appropriate application. Examples of the application include: office automation (OA) devices such as a personal computer monitor, a laptop personal computer, and a copying machine; portable devices such as a cellular phone, a watch, a digital camera, a personal digital assistance (PDA), and a portable game machine; domestic electric appliances such as a video camera, a television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor. Further, the polarizing plate with a condensing element according to the present invention may be appropriately used in such a liquid crystal display device.

EXAMPLES

Hereinafter, the present invention is described in more detail by using examples. However, the present invention is not limited to the examples. The evaluation methods in the examples and comparative examples are as follows.

<Front Contrast Ratio>

A viewing angle measurement apparatus (produced by Autronic-Melchers GmbH, product name "Conoscope") is used to measure front intensities during white display and black display of a liquid crystal display device, and a front contrast ratio is calculated from a ratio between the front intensities (white/black).

<Half-Angle Values of Condensing Element and Isotropic Diffusion Backlight>

A viewing angle measurement apparatus (produced by Autronic-Melchers GmbH, product name "Conoscope") is used to measure an omnidirectional (polar angle range of 0° to 80°) brightness cone of light exited from a condensing element and an isotropic diffusion backlight. As illustrated in FIG. 3, angles corresponding to a half of a maximum brightness (brightness at polar angle of)0° are measured on both sides of a diffusion profile. A value obtained by adding the angles measured on both sides ("(angle a)+(angle a')" in FIG. 3) is set as a half-value angle for each of the condensing element and the isotropic diffusion backlight. The direction perpendicular to the absorption axis direction of the polarizer of the polarizing plate with a condensing element (that is, polarizer of rear polarizing plate) and the direction parallel thereto are set as diffusion directions for evaluation. An average of half-value angles illustrated in Table 1 is an average of half-value angles in the two directions. Light exited from the condensing element is exit light obtained by emitting light from the rear light source (described later) from the flat surface side of the condensing element.

Reference Example 1

Production of Condensing Element

A roll having grooves corresponding to a lenticular lens pattern is used to form the lenticular lens pattern in a surface (single side) of a polymethylmethacrylate (PMMA) sheet. An aluminum pattern is formed by evaporation on a side of the PMMA sheet to which the lenticular lens pattern is not transferred (flat surface side) to provide a reflecting layer including opening portions having a band shape in portions just under top parts of the ridge of the lenticular lens, to thereby produce the condensing element. An area ratio of the opening portions of the reflecting layer is 7% (area ratio of reflecting portions is 93%).

Reference Example 2

Liquid Crystal Cell

A liquid crystal panel is taken out from a marketed liquid crystal display including a liquid crystal cell of MVAmode (produced by SonyCorporation, product name "BRAVIAKDL20J3000"). All optical films located above and under the liquid crystal cell are removed. After that, surfaces of glass substrates located above and under the liquid crystal cell are cleaned for use.

Reference Example 3

Production of Rear Light Source Device

A light diffusion plate (light diffusion plate mounted in "BRAVIA KDL20J3000" produced by Sony Corporation) is laminated on a cold cathode fluorescent lamp (CCFL mounted in "BRAVIA KDL20J3000" produced by Sony Corporation) to production a rear light source device.

Reference Example 4

Production of Isotropic Diffusion Backlight

A diffusion sheet (produced by Physical Optics Corporation, Holographic Diffusers LSD5PE5-10, 92% in haze, 89% in total light beam transmittance, 20° in half-value angle (all directions)) is laminated on an LED array produced by densely arranging 20×20 cannonball type white LEDs having a half-value angle of 20° (produced by Nichia Corporation, Φ5 mm, 3 V) in row and column, to thereby obtain an isotropic diffusion backlight.

Example 1

A rear polarizing plate (produced by Nitto Denko Corporation, product name "NPF-SEG1423DU") is bonded to the condensing element obtained in Reference Example 1 through an acrylic-based pressure-sensitive adhesive (23 μm in thickness), to thereby obtain a polarizing plate with a condensing element. In this case, the condensing element and the rear polarizing plate are arranged so that the absorption axis direction of the polarizer of the rear polarizing plate is parallel to the direction of the opening portions of the reflecting layer of the condensing element (that is, collimating direction of condensing element is perpendicular to absorption axis direction of polarizer of rear polarizing plate).

The liquid crystal cell obtained in Reference Example 2 is bonded to a rear polarizing plate side of the obtained polarizing plate with a condensing element through an acrylic-based pressure-sensitive adhesive (23 μm in thickness). A front polarizing plate (produced by Nitto Denko Corporation, product name "NPF-SEG1423DU") is bonded, through an acrylic-based pressure-sensitive adhesive (23 μm in thickness), to a side of the liquid crystal cell to which the polarizing plate with a condensing element is not bonded, to thereby obtain a liquid crystal panel. In this case, the rear polarizing plate and the front polarizing plate are arranged so that the absorption axis directions of the polarizers thereof are perpendicular to each other.

The rear light source device obtained in Reference Example 3 is connected to a side of the obtained liquid crystal panel on which the condensing element is formed, to thereby obtain a liquid crystal display device (rear light source device/polarizing plate with a condensing element (condensing element/rear polarizing plate)/liquid crystal cell/front polarizing plate).

A front contrast ratio of the obtained liquid crystal display device and a half-value angle of the used condensing element are shown in Table 1.

Example 2 through an acrylic-based pressure-sensitive adhesive (23 μm in thickness), to thereby obtain a liquid crystal panel.

The obtained liquid crystal panel is connected to the isotropic diffusion backlight obtained in Reference Example 4 to obtain a liquid crystal display device (isotropic diffusion backlight/rear polarizing plate/liquid crystal cell/front polarizing plate).

A front contrast ratio of the obtained liquid crystal display device and a half-value angle of the used isotropic diffusion backlight are shown in Table 1.

As is apparent from Example 1, when the condensing element and the rear polarizing plate in the polarizing plate with a condensing element are arranged so that the direction of light collimated by the condensing element is perpendicular to the absorption axis direction of the polarizer of the rear polarizing plate, the liquid crystal display device which is high in front contrast ratio may be obtained.

In contrast to this, when the condensing element and the rear polarizing plate in the polarizing plate with a condensing element are arranged so that the direction of light collimated by the condensing element is parallel to the absorption axis direction of the polarizer of the rear polarizing plate (Comparative Example 1) and when light collimated in all directions enters the rear polarizing plate (Comparative Example 2), unlike the invention in this

TABLE 1

|  |  | Example 1 | Comparative Example 1 | Comparative Example 2 |
|---|---|---|---|---|
| Condensing element |  | Used | Used | Not used |
| Relationship between absorption axis direction[#1] and collimating direction[#2] |  | Perpendicular | Parallel | — |
| Half-value angle[#3] (°) | Direction perpendicular to absorption axis direction[#1] | 10 | 64 | 36 |
|  | Absorption axis direction[#1] | 64 | 10 | 36 |
|  | Average | 37 | 37 | 36 |
| Front contrast ratio |  | 4100 | 3500 | 3600 |

[#1]Absorption axis direction of polarizer of polarizing plate with a condensing element
[#2]Collimating direction of condensing element
[#3]Half-value angle of condensing element in Example 1 and Comparative Example 1 and half-value angle of isotropic diffusion backlight in Comparative Example 2

Comparative Example 1

A liquid crystal display device is obtained by the same manner as in Example 1 except for the point that the condensing element and the polarizing plate are arranged so that the absorption axis direction of the polarizer of the rear polarizing plate is perpendicular to the direction of the opening portions of the reflecting layer of the condensing element (that is, collimating direction of condensing element is parallel to absorption axis direction of polarizer of rear polarizing plate).

A front contrast ratio of the obtained liquid crystal display device and a half-value angle of the used condensing element are shown in Table 1.

Comparative Example 2

A polarizing plate (produced by Nitto Denko Corporation, product name "NPF-SEG1423DU") is bonded to each of both sides of the liquid crystal cell obtained in Reference application, the liquid crystal display device which is high in front contrast ratio cannot be obtained.

What is claimed is:

1. A liquid crystal display device, comprising a rear light source device, a rear polarizing plate, a liquid crystal cell including liquid crystal molecules that are substantially vertically aligned during black display, and a front polarizing plate, which are provided in the stated order, wherein:
   an absorption axis of a polarizer of the rear polarizing plate is perpendicular to an absorption axis of a polarizer of the front polarizing plate;
   condensed light in which a half-value angle $Fw1$ in a direction perpendicular to the absorption axis of the polarizer of the rear polarizing plate is smaller than a half-value angle $Fw2$ in a direction parallel to the absorption axis of the polarizer of the rear polarizing plate enters the rear polarizing plate,
   the half-value angle $Fw1$ in the direction perpendicular to the absorption axis of the polarizer of the rear polarizing plate is in a range of 7° to 30°, and a ratio (Fw2/Fw1) of the half-value angle Fw2 to the half-value angle Fw1 is equal to or larger than 1.2.; and, further comprising a light diffusion element provided on an opposite side of the front polarizing plate with respect to the liquid crystal cell, wherein the light diffusion element diffuses light exited from the front polarizing plate in at least the direction perpendicular to the absorption axis of the rear polarizing plate.

2. A liquid crystal display device according to claim 1, wherein the half-value angle of the condensed light in the direction perpendicular to the absorption axis of the polarizer of the rear polarizing plate is smaller than half-value angles in other directions.

3. A liquid crystal display device according to claim 2, wherein the rear light source device emits the condensed light.

4. A liquid crystal display device according to claim 2, further comprising a condensing element provided between the rear light source device and the rear polarizing plate, wherein the condensing element collimates light emitted from the rear light source device in a predetermined direction to convert the light into the condensed light.

5. A liquid crystal display device according to claim 1, wherein the rear light source device emits the condensed light.

6. A liquid crystal display device according to claim 1, further comprising a condensing element provided between the rear light source device and the rear polarizing plate, wherein the condensing element collimates light emitted from the rear light source device in a predetermined direction to convert the light into the condensed light.

\* \* \* \* \*